Patented May 15, 1934

1,958,745

UNITED STATES PATENT OFFICE 1,958,745

METHOD OF COMPOUNDING RUBBER

Herbert A. Endres, Akron, Ohio, assignor to Wingfoot Corporation, Wilmington, Del., a corporation of Delaware No Drawing. Application November 25, 1930, Serial No. 498,115

4 Claims. (Cl. 106—23)

My invention relates to methods of compounding rubber and it has particular relation to methods of introducing emollient materials into that substance.

One object of the invention is to provide a method of introducing such oleaginous materials as pine tar, oleic acid, stearic acid, etc. into rubber by which the labor and time required to produce adequate blending is reduced to a minimum.

Another object of the invention is to provide a method of compounding rubber whereby high percentages of emollient materials may be introduced into rubber without rendering the latter excessively plastic and tacky.

In the manufacture of rubber compounds, it is customary to introduce therein quantities of oily materials such as pine tar, oleic acid, stearic acid, etc. which act as plasticizers or softeners and aid in the uniform incorporation of the pigments employed in the rubber. Also, some of these emollients are activators of such accelerators of vulcanization as mercaptobenzothiazole and materially reduce the time required to effect combination between the sulfur and the hydrocarbon constituting the rubber. Heretofore, introduction of these emollients into the rubber has been effected merely by milling them directly into solid rubber upon an ordinary mill. This method is somewhat objectionable because of the requirement of power and labor necessary to effect complete admixture of the material into the rubber. Furthermore, the method is impracticable for the manufacture of stocks containing high percentages of plasticizers because the latter become so soft and tacky that they can be handled only with great difficulty.

My invention comprises the provision of a method of compounding rubber in which the emollient required to effect complete blending of the pigments and the rubber, and for rendering the rubber more workable is mixed with the rubber while they are suspended as emulsions in a carrier liquid after which the two are precipitated as a uniformly blended mass.

In practicing the invention, a plasticizing agent such as oleic acid, stearic acid or pine tar is emulsified with water. The proportions of these two materials may be varied within relatively wide limits. However, approximately 120 parts by weight of water intermixed with a corresponding weight of pine tar and 4 parts by weight of concentrated ammonium hydroxide produce excellent results. By thus adding a small amount of ammonia to the solution, a soap is formed with the acids present in the pine tar, these soaps greatly assisting in the dispersions of the tar in the water. The emulsion of pine tar thus obtained may be readily incorporated into a suspension of rubber hydrocarbon such as latex to form a uniform suspension of tar in the latter. The latex suspension employed is preferably in concentrated form, e. g. 60 percent of rubber hydrocarbon in the latex. By this method, it is possible to obtain mixtures containing as much as 50 percent by weight of pine tar to 50 percent of rubber hydrocarbon.

If the above described solution of pine tar containing 120 parts by weight of tar is added to 300 parts of concentrated latex containing 60 percent of rubber hydrocarbon, a mixture comprising 60 percent of rubber and 40 percent of pine tar is obtained. During the admixture of the latex and tar, it is, of course, essential that the latex be thoroughly agitated in order to obtain uniform blending. In some cases, the addition of coagulants to the mixture in order to obtain separation of the rubber-pine tar mixture from the aqueous phase is unnecessary because, under certain conditions, the emulsion of tar apparently acts as a coagulant itself. However, this does not always occur. Where the addition of a coagulant is necessary, any ordinary electrolyte such as acetic acid or a salt of di- or tri-valent metal may be employed. The mixture of rubber and pine tar thus obtained may be successfully employed as a master batch to be added to rubber compounds containing little or no plasticizing agent.

It is thus apparent that the invention contemplates a relatively simple method whereby large quantities of plasticizing agents may be introduced into rubber without subjecting the latter to any appreciable milling operations and without causing it to become excessively tacky.

Although I have described only the preferred forms of the invention in detail, it will be apparent to those skilled in the art that the invention is not so limited but that various modifications may be made therein without departing from the spirit of the invention or from the scope of the appended claims.

What I claim is:

1. In the compounding of rubber, an unvulcanized master batch consisting of only rubber and, in an amount in the neighborhood of forty to fifty percent of the batch, an oleaginous material selected from a group consisting of pine tar, stearic acid, and oleic acid, said unvulcanized master batch being substantially non-tacky at ordinary temperatures.

2. In the compounding of rubber, the process of preparing a substantially non-tacky master batch of rubber containing not less than approximately 40% of an oleaginous material selected from a group consisting of pine tar, stearic acid and oleic acid, which comprises mixing the oleaginous material, water and not less than just sufficient ammonium hydroxide to emulsify said oleaginous material in the water, agitating the resulting emulsion with an aqueous dispersion of rubber until the mixture coagulates, and drying the mixture.

3. In the compounding of rubber, the process of preparing a substantially non-tacky master batch containing only rubber and an amount in the neighborhood of 40-50% of the batch of an oleaginous material selected from a group consisting of pine tar, stearic acid and oleic acid, which comprises forming an oil-in-water emulsion of the oleaginous material by the employment of approximately enough of an ammoniacal compound to emulsify the oleaginous material, mixing the emulsion with an aqueous dispersion of rubber until the mixture coagulates, and segregating the mixture.

4. In the compounding of rubber, the process of preparing a substantially non-tacky master batch of rubber and pine tar, the pine tar being present in the neighborhood of aproximately 40% of the batch, which comprises intermixing in the proportion of 120 parts by weight of water, 120 parts of pine tar and 4 parts of concentrated ammonium hydroxide, mixing the resulting emulsion with latex containing approximately 180 parts of rubber hydrocarbon, agitating the mixture until coagulation occurs, and drying the coagulum.

HERBERT A. ENDRES.